United States Patent Office 3,106,693
Patented Oct. 8, 1963

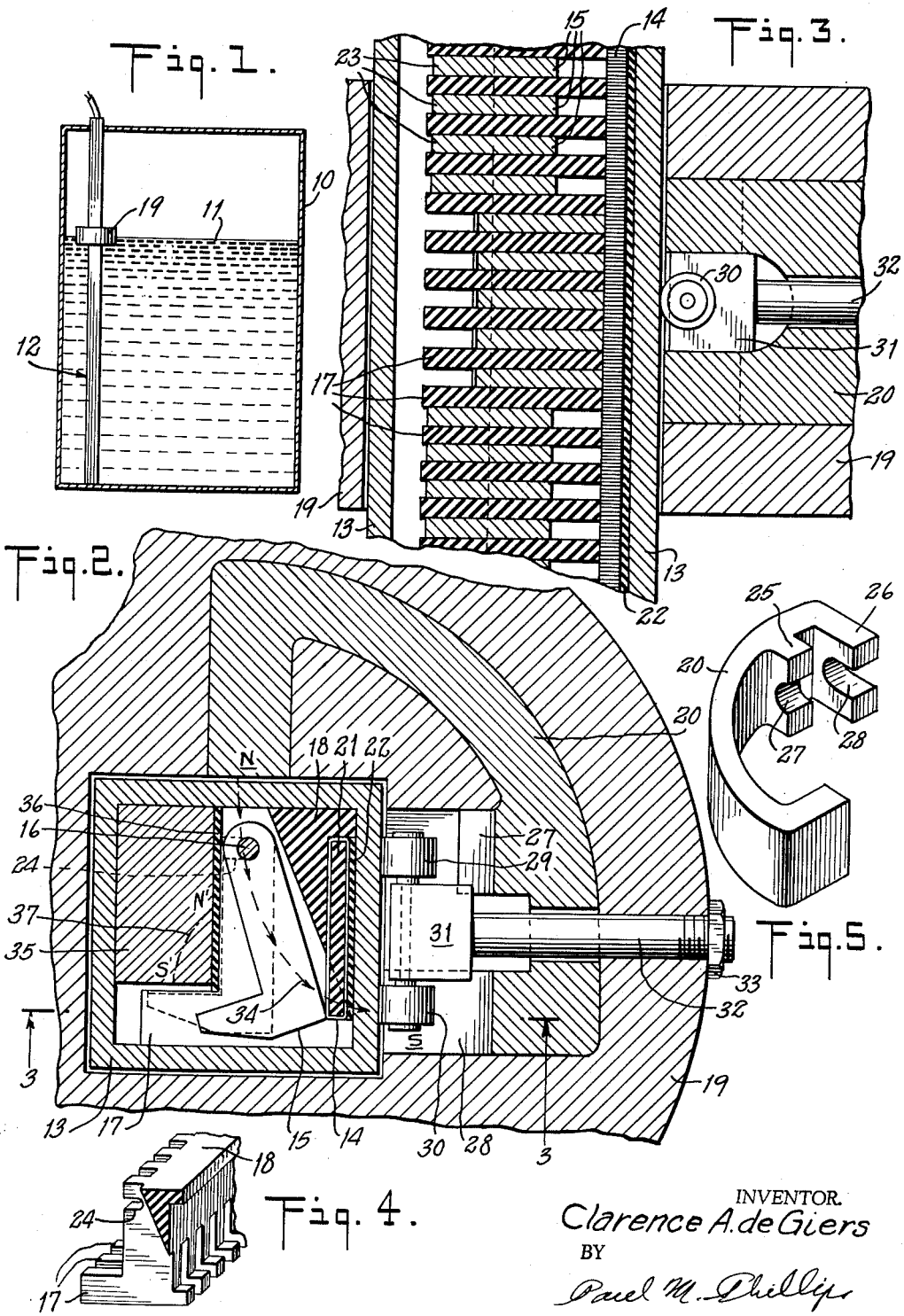

3,106,693
POSITION-RESPONSIVE MEANS
Clarence A. de Giers, Brookville, N.Y., assignor to The Liquidometer Corp., Long Island City, N.Y., a corporation of Delaware
Filed June 14, 1962, Ser. No. 202,424
10 Claims. (Cl. 338—33)

The present invention relates to position-responsive means and particularly to a means for translating the instantaneous position of a member, which is movable in a predetermined path, into an electrical output signal, the value of which is proportional to such instantaneous position. One example of such a means is a liquid-level responsive means, wherein a float or other mechanical level-responsive means is arranged to move a member in a predetermined path. This member in turn may be used to move a primary or first permanent magnet along a path adjacent to and substantially parallel with a magnetically-sensitive means which controls the value of the electrical output of the device.

While the device of the present invention is peculiarly adapted and will be described hereinafter as applied to a means for translating liquid level into an electrical value or output signal, the value of which is proportional to such level, the invention is not limited to this particular use, but includes the translation of any mechanical movement of a member, the position of which it is desired to indicate at a distance by translating it into such an electrical value. This electrical value or output signal may then be used to control known type equipment which may be positioned at a distance and which is capable of indicating the position of the member in question or of taking any other action responsive to such member being or attaining a given position.

As such, the device is an improvement upon the invention of my prior Patent No. 2,484,690, granted October 11, 1949, wherein a plurality of flexible reeds are provided which may be selectively drawn into contact with an elongate resistor by a magnet which is vertically moved outside a shield surrounding the resistor and the reeds, the magnet preferably being carried by a float. An electrical system by which the division of electrical resistance, as determined by the float control, is translated into an indication of liquid level is shown in the patent aforesaid. Other systems, one of which in some respects is similar thereto, for translating electrical resistance into an indication of liquid level, are disclosed in my pending application Serial No. 139,206, filed September 19, 1961.

In both the systems aforesaid the contact with a resistor was made by flexible means, e.g. a plurality of reeds, which were drawn into contact with the resistor by magnetic force exerted in a manner so that there would be no relative frictional movement between the flexible means (the reeds) and the resistor. The present invention includes this advantageous relationship and thus partakes of the advantages of my two earlier inventions, in that there is no rapid wearing of the resistor incident to the friction of a slider in contact with the resistance wire, such as might be occasioned, for example, if the device were to be used in a fuel tank in a ship where the motion of the ship caused some more or less continuous variations of the liquid level and hence rubbing motions of a slider such as are conventionally used in potentiometers, rheostats or the like. Such rubbing motion in practice has been found to cause rapid wear and sometimes even failure of the resistance wire.

The present invention distinguishes from my two earlier inventions aforesaid particularly in that there is provided what might be termed a return magnet, which causes the magnetically-sensitive movable means, which are actuated by the principal magnet moved by the float, to move out of contact with said resistor once the float-moved principal magnet is out of its closest proximity to each portion of said movable means respectively. This provides a more positive and truer functioning liquid level-responsive means than was provided by the devices of my earlier inventions, which depended upon the resiliency of the several reeds for return or retraction actions of the several reeds respectively. In accordance with the present invention, this return or retractive movement is effected by a transversely magnetized strip having a lower magnetic pull upon the movable means than the principal magnet, which moves them into contact with the resistor. Thus, in accordance with this invention, the principal or first magnetic means is sufficiently powerful to overcome the magnetic pull of the return or retractive magnet and to move a part of the movable means, which is in close magnetic proximity to the first magnetic means, into contact with the resistor, so as to make an electrical contact at a point along the resistor which is proportional to the liquid level.

The present invention is intended to include generically not only the construction shown herein, wherein the movable magnetically-responsive means are represented as hereinafter described by a plurality of individual hammers or the like pivoted on a common wire, but also the subject matter of a copending application of the present inventor and Joseph Marinelli, Serial No. 202,455 filed June 14, 1962. Thus all novel subject matter common to the two cases is claimed in the present application, said copending application of the present inventor and said Marinelli being restricted to subject matter readable solely upon that disclosure and not upon the present disclosure.

Further objects and advantages of the present invention will become apparent from the following detailed description of a preferred embodiment thereof, which is also illsutrated in the accompanying drawings, in which:

FIG. 1 is a diagrammatic view substantially in vertical section, showing a container for a liquid in connection with which the present invention is used;

FIG. 2 is a fragmentary view in horizontal section and on a greatly enlarged scale of a portion of the liquid level-responsive means illustrating the operation of the device and showing a portion of the primary actuating magnet carried by the float;

FIG. 3 is a fragmentary view substantially in vertical section taken on the line 3—3 of FIG. 2;

FIG. 4 is a fragmentary view in perspective and on a somewhat smaller scale of a portion of the insulating means in which the movable means are mounted; and FIG. 5 is a view in perspective of the principal magnet which is carried by the float in the device as shown in the previous figures, with the magnet being shown substantially inverted with respect to the disposition of this magnet in the view of FIG. 2.

Referring particularly to FIG. 1, the device of the present invention is intended for sensing the level of liquid in a container. Such a container is shown, for example, in FIG. 1 at 10 and contains liquid up to a level 11. Extending preferably vertically through the container is a device generally indicated at 12 which may be the device of the present invention, this device preferably but not necessarily including an outer shield or shielding means shown formed as a hollow rectangular column 13 and always including a means here shown within said shielding means, including a resistance coil or resistor 14 and means movable by a magnet outside said shielding means into engagement with the resistance coil, these means being shown at 15 and comprising in this instance a plurality of L-shaped members pivoted on a common vertically extending wire 16 and separated from one another by tooth-like portions 17, FIGS. 2, 3 and 4, of an insulating structure 18 which is preferably of plastic material or the like.

It will be understood that while the device 12 is shown vertically disposed and is arranged to serve as a guide for a float 19 in a manner generally similar to the float arrangement in my prior Patent No. 2,484,690 as aforesaid, it is contemplated that any suitable type of float, operating in any suitable manner, for example, one pivoted on a float arm for movement about a fixed axis, could be used as long as the float is caused to move a first permanent magnet, here shown at 20, in a path which is essentially parallel to the longitudinal extent of the resistance coil 14. This path is here shown vertical and in a straight line in the accompanying drawings. If it were desirable, however, the path could be at some direction other than vertical, so long as a magnet corresponding to that shown at 20 was moved by a float in a substantially parallel path. Again, the extent of the resistance coil or resistor 14 need not be in a straight line, as it could be, for example, arranged in a substantially circular path or a portion thereof or some other curved path, similar, for example, to the arrangement shown in my copending application Serial No. 139,206 aforesaid. Again, if this were done, it would be necessary that the magnet 20 or one equivalent thereto should be moved in a corresponding path, so as to move some portion of one or a group of movable members into contact with the resistance coil at a position determined by the level sensed by the float.

The shielding means shown at 13 in the present instance is preferably formed of some non-magnetic material, such as brass or aluminum, and is further of a material which will be chemically neutral with respect to the liquid in the container so as not to be substantially corroded thereby. The shielding means 13 serves to prevent all contact between the means shown therein and any liquid which may be in the container 10. As shown in FIGS. 2 and 3, the resistance coil 14 is preferably wound upon a suitable insulating member 21 and is further insulated by a strip of insulation 22 or the like from the adjacent wall of the shielding means 13.

The shielding means 13 is usually desired as aforesaid so as to prevent contact between any liquid which may be in the container 10 and the resistor 14, the movable means 15, the wire 16 and the return magnet hereinafter described, all of which are shown within the shielding means. This serves not only to prevent shorting of the resistor, in the event that an electrically conductive liquid is being measured, but also to prevent the accumulation of dirt and/or liquid residues on the electrical parts. There are instances, however, as where a clean hydrocarbon liquid as gasoline is being measured, where direct contact between the liquid and the resistor and other electrically connected parts is not harmful. In such cases the shielding means may be wholly omitted as it is not per se essential to the present invention.

The individual movable means shown at 15, which are substantially L-shaped in cross section as aforesaid, are shown in FIG. 2 in full lines in the positions which they occupy respectively when the magnet 20 is in its closest proximity thereto. Their positions, whenever the primary magnet 20 is out of such closest magnetic proximity thereto, is shown in dotted lines in FIG. 2 and at 23 in FIG. 3. All these movable members 15 are pivoted on a common wire 16 as aforesaid, which extends vertically through the device and is positioned by being disposed at the bottom of a plurality of aligned recesses 24 formed in the teeth 17 of the insulating structure 18. One end of the wire 16 may serve as one electrical terminal for the device in the manner taught in my prior Patent No. 2,484,690 aforesaid. The other contact or contacts of the device are one or both the terminals of the electrical resistor 14 (depending on whether it is to be used as a rheostat or as a potentiometer), which are suitably connected in the circuit in a manner not illustrated herein, but which will now be obvious to those skilled in the art.

In the present instance the magnet 20 may be secured in position in the float 19, which may be of cork or any other suitable material or construction adapted for this purpose, i.e. so as to have a much lower bulk density than that of the liquid in the container 10. The securing means for this purpose is not critical from the point of view of the present invention. As shown, however, a portion of this magnet is provided with a pair of inwardly extending portions 25 and 26 which have aligned recesses 27 and 28 therein for receiving a structure including a pair of rollers 29 and 30 mounted on a common transverse axis and carried by a head 31 which is secured to a post 32 having a nut 33 threaded onto its outer end. This structure or some equivalent construction serves to hold the magnet 20 to and within the float 19 and also serves to position the rollers 29 and 30 in place in the float, so that they may bear properly upon an outer plane surface of the shielding means 13 as shown in FIG. 2.

The permanent magnet 20 is preferably so magnetized that it has its opposite poles disposed as shown at N and S in FIG. 2. Thus when this magnet is opposite and at its closest proximity to one of the L-shaped members forming a part of the movable means 15, that member is moved from its dotted line position shown in FIG. 2 to its full line position shown in that figure. In the latter position it engages a portion of the resistance coil 14, so as to form an electrical path from this point along the coil to the wire 16, which is the common pivot for all the movable means 15. This arrangement may serve either as a rheostat or as a potentiometer in accordance with the manner in which it is electrically connected in the circuit as aforesaid.

Furthermore, when each member of the movable means 15 is in its full line position as shown in FIG. 2, there is a magnetic circuit substantially completed between the north and south poles of the magnet 20 along the path of the dotted line 34 where some of the portions of the dotted line are provided with arrows.

The arrangement of the individual members of the movable means 15 with a magnet of the type shown at 20 in FIG. 2, having its poles adjacent to opposite ends of the movable members or their equivalent so that a magnetic circuit is formed when such members are moved to their position engaging the resistance coil 14, is a particular feature of the present invention. At this time the attraction of the magnet 20 is such as will tend to move each member respectively of the entire movable means 15 to the right, as seen in FIG. 2. This will not only cause one end of each such member to make good electrical contact with the resistor 14, but also will cause the other end of each such member to make good electrical contact with the common wire 16.

Furthermore, while the prior art as aforesaid has relied upon the resiliency of each of a plurality of reeds to move them away from the resistance coil when the primary magnet moved by the float is out of proximity therewith, the present invention provides a second or return magnet, which serves to retract those portions of the resistance coil-engaging means when such portions are out of magnetic proximity to the primary magnet 20. As this principle is embodied in the present particular disclosure, the return or second permanent magnet serves to retract the members constituting the movable means 15 from their full line to their dotted line positions as seen in FIG. 2, in which these L-shaped members partially embrace the return magnet which is shown in the drawings at 35. This magnet 35 is separated from the L-shaped members 15 by a strip of insulating material 36, so that there can be no direct electrical contact therewith. However, when the several movable means 15 are not strongly attracted by the immediate proximity of the first magnet 20 to their full line positions, they are drawn by the second permanent magnet 35 to their dotted line positions in which these members 15 embrace two sides of the magnet 35. This magnet is transversely polarized, so that at the time each of the L-shaped members constituting the movable means 15 is at its dotted line or inoperative position, a magnetic circuit is substantially completed between the north and south poles of this magnet, shown by the letters N' and S' and in a path as shown by the dot-and-dash line 37 in FIG. 2.

When, however, the magnet 20 is vertically opposite one or more of the movable means 15, the magnetic force of this magnet 20 overcomes that of the return magnet 35, so as to move the respective L-shaped members from their dotted to their full line positions as shown in FIG. 2. The magnet 20 may be of such vertical dimensions that two or more of the movable members 15 will always be in such close magnetic proximity thereto that they will be simultaneously attracted by this magnet and moved to their full line positions as seen in FIGS. 2 and 3.

The insulating member 18 having the teeth 17 formed thereon is positioned in the shielding means 13 as shown in FIGS. 2 and 3 and serves to separate the several movable means or members 15, so that they are individually operable or movable and further serves as guides for these members to prevent them from any undesired movement except the slightly angular movement about the axis of the wire 16. These teeth 17 further prevent movement of the several L-shaped members 15 except under the magnetic pull of one or the other of the permanent magnets 20 or 35.

While there has been shown and described herein but one physical embodiment of the present invention, the intended scope thereof and equivalents of the means particularly illustrated and specifically described have been pointed out as the description has proceeded. Other equivalents and alternatives will occur to those skilled in the art from the foregoing particular disclosure. I do not wish to be limited, therefore, except by the scope of the appended claims, which are to be construed validly as broadly as the state of the art permits.

What is claimed is:

1. A liquid level-responsive means for selectively making electrical contact with a resistor at a position proportional to the level of the liquid in a container, comprising
   a float mounted for movement in a predetermined path so as to be afloat on the surface of the liquid in said container,
   an elongate electrical resistor disposed in said container with its long dimension in a predetermined extended position,
   movable magnetically-sensitive means engageable with said resistor at points therealong and disposed adjacent thereto throughout the length of that portion at least of said resistor arranged to be engaged by said movable means,
   first permanent magnet means positioned by said float and arranged to be moved thereby in a path substantially parallel to the long dimension of said resistor and in magnetic proximity with said movable means for causing contact between a portion only of said movable means and said resistor at a zone adjacent to the position of said first magnet means,
   and a second permanent magnet means which is separate and distinct from said first permanent magnet means and is disposed generally parallel to said resistor and in magnetic proximity with said movable means, said second permanent magnet means having a lesser attraction for said movable means than said first permanent magnet means when the latter is in its closest proximity to each portion respectively, but effective to hold those portions of said movable means which are out of said closest proximity to said first permanent magnet means away from electrical contact with said resistor, and to retract portions of said movable means away from contact with said resistor when said first permanent magnet means is out of magnetic proximity therewith.

2. A liquid level-responsive means in accordance with claim 1, in which a shielding means is provided which completely encloses said resistor, said movable magnetically-sensitive means, and said second permanent magnet means, and prevents any contact therewith of any liquid which may be in said container.

3. A liquid level-responsive means in accordance with claim 1, in which said elongate resistor is disposed within a hollow substantially vertically extending enclosure, in which the first-named permanent magnet means is carried by said float, and in which said float is substantially annular in form and surrounding said enclosure so as to be guided thereby in its vertical movement as the liquid in said container changes.

4. A liquid level-responsive means for selectively making electrical contact with a resistor at a position proportional to the level of the liquid in a container, comprising
   a float mounted for movement in a predetermined path so as to be afloat on the surface of the liquid in said container,
   an elongate electrical resistor disposed in said container in a predetermined extended position,
   a plurality of individually movable, magnetically-sensitive means selectively engageable with said resistor at points therealong, and disposed adjacent thereto throughout the length of that portion at least of said resistor arranged to be engaged by said plurality of movable means, each of said movable means being individually movable toward and away from a position in contact with said resistor independently of all others of said plurality of movable means and all of said plurality of movable means being electrically connected together,
   first permanent magnet means positioned by said float and arranged to be moved thereby in a path which is substantially parallel to the long dimension of said resistor and in magnetic proximity with said plurality of said movable means, for selectively causing said movable means to move into contact with a portion of said resistor respectively at a position substantially adjacent to the position of said permanent magnet means;
   and a second permanent magnet means, which is separate and distinct from said first permanent magnet means, and extends generally parallel to said resistor and in magnetic proximity with each of said plurality of movable means, said second permanent magnet means having a lesser attraction for said movable means than said first permanent magnet means when the latter is in its closest proximity to each of said plurality of movable means respectively, but said second permanent magnet means being effective to hold those of said plurality of movable means which are out of said closest proximity to said first permanent magnet means away from electrical contact with said resistor and to retract those of said movable means away from contact with said resistor when said first permanent magnet means is out of close magnetic proximity therewith respectively.

5. A liquid level-responsive means in accordance with claim 4, in which said elongate resistor extends vertically within the container in which the liquid level is to be measured, and shielding means is provided also extending vertically within said container and surrounding said resistor, said movable means and said second permanent magnet, so as to keep them out of contact with any liquid that may be in said container;
   and in which said float is substantially annular in form and is mounted for vertical movement surrounding said shielding means, said first permanent magnet means being carried directly by said float and moving therewith as the level of liquid within said container changes.

6. A liquid level-responsive means in accordance with claim 5, in which said elongate resistor and said shielding means thereabout are both disposed in a substantially vertical position within said container, in which each of said plurality of individually movable magnetically-sensitive means constitutes a metallic element which is pivoted on a common, vertically-disposed wire and is electrically in contact with said wire, so that all said movable means are electrically connected together, and insulating means spacing said movable means apart in a vertical direction, so that each of said metallic elements is movable by said permanent magnets independently of the others of said metallic elements.

7. A liquid level-responsive means in accordance with claim 6, in which said first permanent magnet means is arranged for movement in a path outside of said shielding means and parallel to the longitudinal extent of said resistor,
and in which said first permanent magnet means is arranged so as to have its opposite poles closest to two sides respectively of said shielding means and in such a position that it will cause at least one of said metallic elements which is closest thereto to move to a position in contact with said resistor; and when each of said metallic elements has been moved into contact with said resistor by said first permanent magnet means, a magnetic circuit will exist between the poles of said first permanent magnet means and through at least one of said metallic elements which have been so moved.

8. A liquid level-responsive means in accordance with claim 6, in which each of said plurality of metallic elements is substantially L-shaped and is mounted so that in its inoperative position, out of contact with said resistor, each of said L-shaped metallic elements will extend around two sides of said second permanent magnet means;
and in which said permanent magnet means is transversely magnetized in such manner that its poles extend toward the two sides thereof substantially embraced by the L-shaped metallic elements aforesaid, so that when each of said L-shaped metallic elements is at its inoperative position as aforesaid, magnetic circuits exist through portions of said second permanent magnet means and through said L-shaped metallic elements respectively.

9. A liquid level-responsive means in accordance with claim 6, in which each of said plurality of metallic elements is substantially L-shaped and is mounted for pivotal movement about a common, vertically-extending wire, which electrically connects all of said metallic elements together;
in which said first permanent magnet means is mounted for movement in a path outside said shielding means and parallel to the longitudinal extent of said resistor and is directly carried by said float, said first permanent magnet means having its opposite poles respectively closest to two sides of said shielding means and in such a position that it tends to cause said metallic elements to move to a position in contact with said resistor when said first permanent magnet means is in its closest position to each of said plurality of movable means respectively, and when each of said metallic elements has been moved into contact with said resistor by said first permanent means, a magnetic circuit exists between the poles of said first permanent magnet means and through at least one of said metallic elements;
said metallic elements being disposed so that the L-shape thereof is arranged to embrace and extend around two sides of said second permanent magnet means when each of said metallic elements is at its inoperative position remote from said resistor;
and in which said second permanent magnet means is transversely magnetized in such manner that its poles extend toward the two sides thereof which are substantially embraced by the L-shaped metallic elements aforesaid, so that when each of said metallic elements is at its inoperative position, magnetic circuits will exist through portions of said second permanent magnet means and through each of said metallic elements respectively.

10. Means for translating the instantaneous position of a member, which is movable in a predetermined path, into an electrical output signal, the value of which is proportional to said instantaneous position, comprising
an elongate electrical resistor disposed with its long dimension arranged substantially parallel to said predetermined path,
movable magnetically-sensitive means engageable with said resistor at points therealong and disposed adjacent thereto throughout the length of that portion a least of said resistor arranged to be engaged by said movable means,
first permanent magnet means positioned by said member and arranged to be moved thereby in a path which is substantially parallel to the long dimension of said resistor and in magnetic proximity with said movable means, for causing contact between a portion only of said movable means and said resistor at a zone adjacent to the position of said first magnet means,
and a second permanent magnet means which is separate and distinct from said first permanent magnet means and is disposed generally parallel to said resistor and in magnetic proximity with said movable means, said second permanent magnet means having a lesser attraction for said movable means than said first permanent magnet means when the latter is in its closest proximity to each portion thereof respectively, but effective to hold those portions of said movable means, which are out of said closest proximity to said first permanent magnet means, away from electrical contact with said resistor, and to retract portions of said movable means away from contact with said resistor when said first permanent magnet means is out of magnetic proximity therewith.

No references cited.